United States Patent [19]

Libianchi

[11] 4,093,328

[45] June 6, 1978

[54] DEVICE FOR CLAMPING AND EJECTING FROM A CONTAINER AN AUTORADIO OR THE LIKE

[75] Inventor: Giulio Cesare Libianchi, Rome, Italy

[73] Assignee: Autovox S.p.A., Rome, Italy

[21] Appl. No.: 780,613

[22] Filed: Mar. 23, 1977

[51] Int. Cl.² .................... E05B 73/00; F16B 41/00
[52] U.S. Cl. ................................. 312/333; 248/203; 312/319
[58] Field of Search ............... 312/7, 223, 319, 330, 312/333; 248/203

[56] References Cited

U.S. PATENT DOCUMENTS

| | | | |
|---|---|---|---|
| 3,592,521 | 7/1971 | Cox | 312/319 |
| 3,993,278 | 11/1976 | Race | 248/203 |

*Primary Examiner*—Casmir A. Nunberg

*Attorney, Agent, or Firm*—James W. Gillman; Donald J. Lisa; Phillip H. Melamed

[57] ABSTRACT

A clamping and ejecting assembly for a support structure for an autoradio or the like is disclosed. A box shaped container is adapted to receive and firmly support a removable apparatus such as an autoradio or tape player having a complimentary clamping means provided on it. A spring element is mounted to the bottom of the box shaped container and is reciprocally movable with respect to the container between a first retracted position and a second extracted position. Clamping means are provided on the spring element and project into a central receiving cavity of the box shaped container through an opening in the bottom of the container to matingly engage the complimentary clamping means on the inserted apparatus and thereby maintain the apparatus firmly inserted in the support container when the spring element is held in its first retracted position.

13 Claims, 4 Drawing Figures

DEVICE FOR CLAMPING AND EJECTING FROM A CONTAINER AN AUTORADIO OR THE LIKE

BACKGROUND OF THE INVENTION

This invention relates to an device suitable for clamping and firmly holding an apparatus, such as a removable autoradio, a tape recorder, a CB transceiver, or the like, in a container and to eject said apparatus from this container when it is desired to remove it therefrom.

It is often necessary to provide for easily removing an apparatus from a supporting container so as to utilize the apparatus elsewhere. In addition, it is also desirable to have the apparatus easily insertable into a supporting container and firmly held in position by the supporting container. Generally, it is also desirable to have a supporting container which will prevent the pilferage of the apparatus during unguarded periods of time. For example, if the apparatus is a CB transceiver intended for mounting in an automobile, it would be desirable to have a supporting container which would prevent the theft of the CB radio during the unattended parking of the automobile for short periods of time.

While prior clamping and ejecting devices for supporting containers have been developed, most of these devices are costly, complex and compromise the easy insertion, easy removability, and firm support properties which the device should exhibit.

SUMMARY OF THE INVENTION

An object of this invention is to provide a device which easily and rapidly permits the clamping of an apparatus into a holding container or the ejecting of an apparatus out of a holding container.

According to the present invention, a clamping and ejecting assembly for a support structure is provided. Typically, the support structure comprises a container which is adapted to receive an apparatus such an autoradio or the like which has a complimentary clamping means on it. The assembly comprises a support structure for receiving and supporting an apparatus inserted therein which has a complimentary clamping means on it. A spring element is mounted to the support structure and is reciprocally movable with respect to the support between a first retracted position and a second extracted position. Clamping means are provided on the spring element and are movable therewith for matingly engaging with the complimentary clamping means which are contained on the apparatus to be inserted in the support structure. The clamping means on the spring element maintains the apparatus inserted in the support structure when the spring element is in its first retracted position. Holding means are provided for selectively fixing the spring element in its first retracted position. Thus the spring element will clamp apparatus inserted into the support structure since the holding means will keep the spring element in its first retracted position. In order to remove the apparatus from the support structure, the spring element is moved into its second extracted position and in this position the spring element will permit the removal of the apparatus from the support structure.

In a preferred embodiment of the present invention, the support structure comprises a box shaped container having a front portion, a bottom portion and an interior cavity. The spring element comprises a generally flat element having a central folding line which divides it into a rear and front portion, the front portion having a reduced end width portion. The clamping means provided on the spring element preferrably comprises a spherical half cup stamping on the rear portion of the spring element which normally projects into the interior cavity of the box shaped container through an opening in the bottom of the container. The front portion of the container has a window formed therein which has a wide upper portion and a narrow lower portion, the narrow lower portion being dimensioned so that the reduced end width portion of the spring element can fit therein and thereby hold the spring element in its first retracted position. Additionally, an ejection spring is provided in the container for selectively ejecting the inserted apparatus out of the container when such operation is desired. Also, spring means are provided to urge the spring element towards its first retracted position after an apparatus has been removed from the support container.

BRIEF DESCRIPTION OF THE DRAWINGS

An embodiment of the invention is illustrated, by way of example, in the accompanying drawings, in which.

DESCRIPTION OF THE PREFERRED EMBODIMENT

Figure 1:
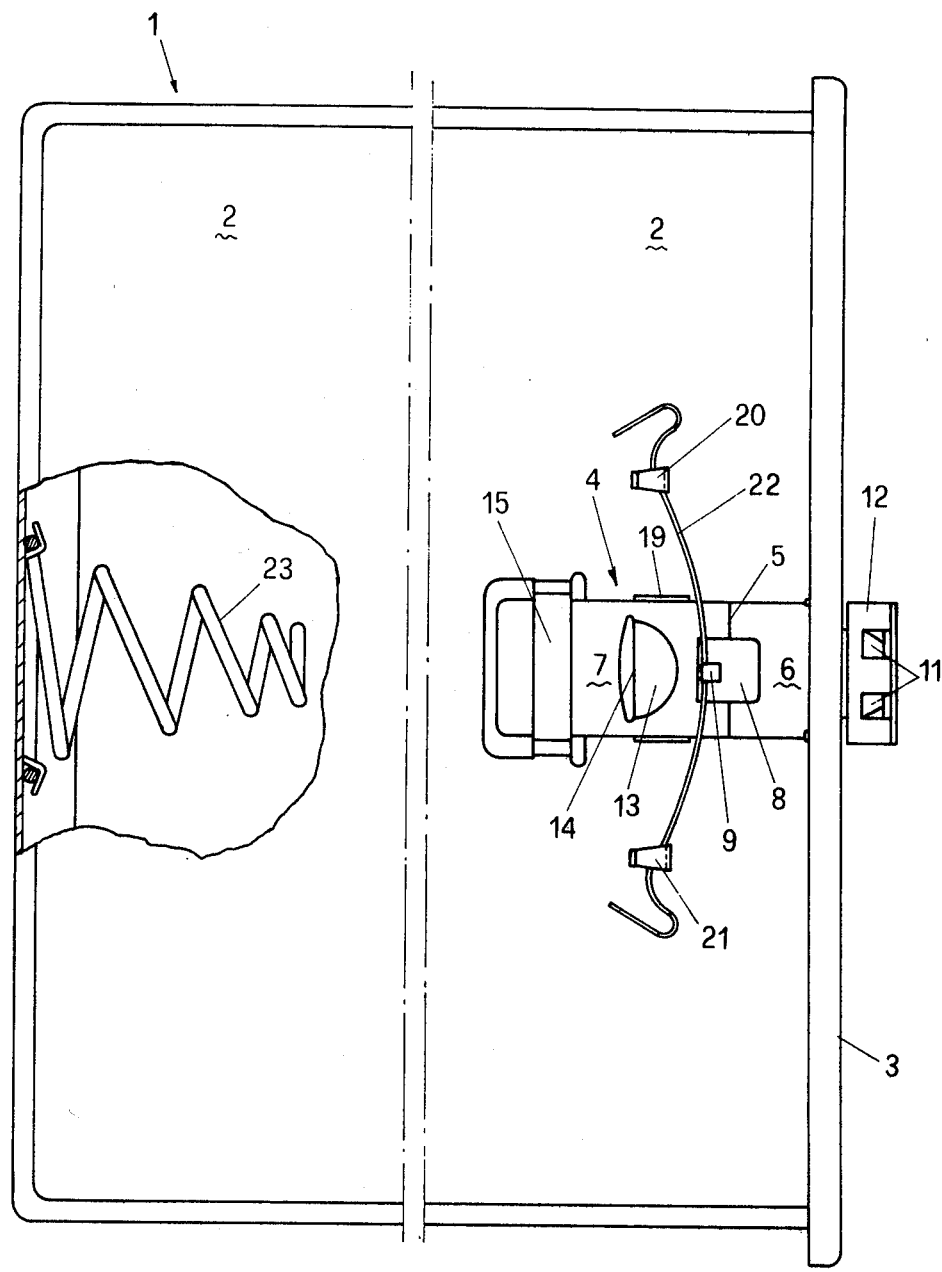
FIG. 1 is a bottom plane view of the device of the present invention mounted on a container for an autoradio, or the like, with a section of the container shown removed.

With reference to the accompanying drawings, and in particular to FIG. 1, a holding container 1 for an autoradio or the like is shown in the form of a box having a central cavity and a bottom 2. The container 1 has a front aperture which allows the insertion, into the central cavity of the container 1, of an autoradio, a tape recorder, a CB transceiver, or any other apparatus which is desired to be removably installed in the container. Around the front aperture of the container 1 there is arranged a mask 3 (see also FIG. 4). A flat spring element 4 is mounted to the bottom 2 and is reciprocally movable with respect to the container 1 between a first retracted position (FIG. 1) and a second extracted position (not specifically shown).

Figure 2:
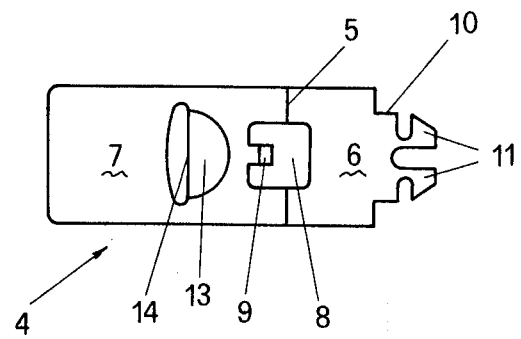
FIG. 2 is a plane view of a flat spring element of the device shown in FIG. 1.
Figure 3:
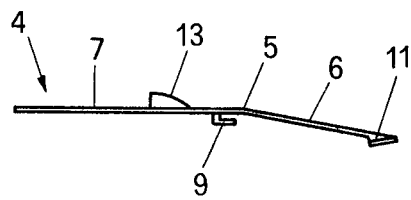
FIG. 3 is a side view of the spring element shown in FIG. 2.

The invention, as shown in FIGS. 2 and 3, includes the flat spring element 4 which consists of a steel leaf. The element 4 is formed with a folding line 5 which divides the element 4 into a front part 6 and a rear part 7. At the folding line 5 in the element 4, there is formed a centrally arranged slot 8, and a catch 9 which projects downward from the rear edge of the slot 8. The front part 6 of the element 4 has a nominal width portion and a reduced width end portion 10, and part 6 terminates with a pair of resilient teeth 11. A key 12 (FIG. 1) can be slide onto the forward end of the element 4 until being clamped by the teeth 11.

The rear part 7 of the element 4 is provided with an upward stamping 13 in the form of a spherical half cup terminating in a detent-like edge 14.

A small bridge 15 (FIG. 1), integral with the bottom 2 of the container 1, guides the element 4 during reciprocal motion of the element 4 with respect to the container 1. The bridge 15 holds portions of the rear part 7 of the element 4 in contact with the bottom 2 of the container 1.

Figure 4:
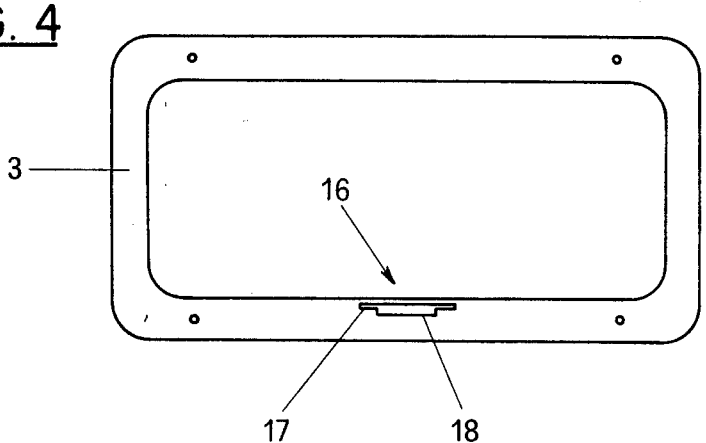
FIG. 4 is a front elevation view (drawn on a smaller scale) of the container shown in FIG. 1.

The front part 6 of the element 4 is projected away from the bottom 2 and is slideable into a window 16 of the mask 3, as is best shown in FIG. 4.

The window 16 is formed by a widened upper portion 17 having substantially the same width as the nominal width of the element 4 and a narrow lower portin 18 having substantially the same width as the reduced width end 10 of the element 4. The bottom 2 of the container 1 has an opening 19 (FIG. 1) through which the upward stamping 13 projects into the central cavity of the container 1.

Two small catches 20 and 21 are formed on the bottom 2 of the container 1, and a return spring 22, formed from a steel wire shaped into a bow form, is attached between the catches 9, 20 and 21. A volute spring 23 is secured to the center rear part of the central cavity of the container 1.

On the autoradio body, or the like, (not shown) intended to be introduced into the central cavity of the container 1, there is formed a recess (not shown) complimentary with the stamping 13 of the spring element 4.

The operation of the device of the present invention is as follows. In the rest position with the autoradio completely outside of the container 1, the spring 22 urges the element 4 inward into a first retracted position (FIG. 1) with the reduced width end portion 10 located within the narrow lower portion 18 of the window 16 due to the self elasticity of the spring element 4 and the folding of the element 4 at the line 5.

By initially inserting an autoradio through the front aperture of the container 1, the base of the autoradio, as it slides inward, depresses the stamping 13 and hence the element 4.

As the autoradio continues to be inserted into the container 1, it engages the volute spring 23 whereby loading it. When the autoradio reaches a completely inserted position, the stamping 13 penetrates through the complimentary recess of the autoradio body effectuating a clamping of the autoradio. The autoradio cannot be ejected by the spring 23 since the element 4 cannot move outwards (into its second extracted position) because the wide portion of the element 4 cannot pass through the narrow lower portion of the window 16. This autoradio is held in position by means of the stamping 13 of the element 4. The stamping 13 can be considered a clamping means which matingly engages with the complimentary clamping recess in the autoradio.

In order to remove the autoradio from the container 1, the key 12 is urged upwardly against the elasticity of the spring element 4. In this manner the element 4 can slide outwards with its front part 6 sliding in the upper widened portion 17 of the window 16 under the outward action of the volute spring 23 pushing the autoradio outward. While the element 4 is moving outwards, the stamping 13 comes into contact with the forward edge of the opening 19 and slides therealong depressing the element 4 until the stamping 13 is withdrawn from the complimentary recess of the autoradio body (the spring element 4 now being in its second extracted position) and thereby effectuating a release of the autoradio from the container 1.

Simultaneously with the outward movement of the element 4, the spring 22 is charged. When the stamping 13 is withdrawn from the complimentary recess in the autoradio, the autoradio can be completely withdrawn from the central cavity of the container 1 by hand. After the autoradio is completely extracted, the spring 22 returns the element 3 inward back to its first retracted (rest) position. In such position, the portion 10, having a reduced width, of the element 4, will snap into the lower narrow portion 18 of the window 16.

While I have shown and described specific embodiments of this invention, further modifications and improvements will occur to those skilled in the art. All such modifications which retain the basic underlying principles disclosed and claimed herein are within the scope of this invention.

I claim:

1. A clamping and ejecting assembly for a support structure adapted to receive an apparatus, such as an autoradio or the like having complimentary clamping means thereon, said assembly comprising:

support means for receiving and supporting an apparatus having complimentary clamping means thereon;

spring element means mounted to said support means and reciprocally movable with respect to said support means between a first retracted position and a second extracted position;

clamping means arranged upon and movable with said spring element means for matingly engaging said complimentary clamping means of said apparatus and maintaining said apparatus inserted in said support means with said spring element means in its first retracted position; and holding means mounted to said support means for selectively fixing said spring element means in its first retracted position, wherein said spring element means will clamp said apparatus in said support means while said holding means will keep said spring element means in said first retracted position, said holding means selectively releasing said spring element means and permitting removal of said apparatus from said support by allowing said received apparatus to move said spring element from its first retracted position to its second extracted position during removal of said apparatus whereby said clamping means disengages said complimentary clamping means on said apparatus when said spring element means is in its extracted position.

2. An assembly according to claim 1 wherein said support means includes a container for receiving and supporting said apparatus.

3. An assembly according to claim 2 wherein said spring element means comprises a substantially flat element having a folding line which divides it into a rear part and a front part, said front part having a width and provided with an end portion having a reduced width.

4. As assembly according to claim 3 wherein said clamping means comprises a spherical half-cup and a detent formed by a stamping on said rear part of said spring element means.

5. An assembly accordingly to claim 4 wherein said container has a bottom and an interior cavity, and wherein bridge means are arranged underneath the bottom of said container, said bridge means constraining portions of the rear part of said spring element means in contact with respect to the container bottom, said clamping means projecting into the interior of the container through an opening formed in the container bottom.

6. An assembly according to claim 3 wherein said container has a bottom and an interior cavity, and wherein bridge means are arranged underneath the bottom of said container, said bridge means constraining portions of the rear part of said spring element means in contact with respect to the container bottom, said clamping means projecting into the interior of the container through an opening formed in the container bottom.

7. An assembly according to claim 3 wherein said container has a front part and wherein holding means for said spring element means comprises a window provided in the front part of said container, said window having a widened upper portion through which said front portion of said spring element means can pass and a narrow lower portion that accommodates only said reduced end portion of the spring element means thereby holding said spring element means in said first retracted position.

8. An assembly according to claim 2 further comprising a spring means that urges said spring element means towards its first retracted position.

9. As assembly according to claim 8 further comprising additional spring means coupled to said container for urging apparatus already inserted in said container, out of said container.

10. As assembly according to claim 2 further comprising additional spring means coupled to said container for urging apparatus already inserted in said container, out of said container.

11. A clamping and ejecting assembly for a support structure adapted to receive an apparatus, such as an autoradio or the like having complimentary clamping means thereon, said assembly comprising:
   support means including a container for receiving and supporting an apparatus having complimentary clamping means thereon;
   spring element means mounted to said support means and reciprocally movable with respect to said support means between a first retracted position and a second extracted position, said spring element means comprises a substantially flat element having a rear and a front part;
   clamping means arranged upon and movable with said spring element means for matingly engaging said complimentary clamping means of said apparatus and maintaining said apparatus inserted in said support means with said spring element means in its first retracted position;
   holding means for selectively fixing said spring element means in its first retracted position, whereby said spring element means will clamp said apparatus in said support means while said holding means will keep said spring element means in said first retracted position; and
   wherein said container has a bottom and an interior cavity, and wherein bridge means are arranged underneath the bottom of said container, said bridge means constraining portions of the rear part of said spring element means in contact with respect to the container bottom, said clamping means projecting into the interior of the container through an opening formed in the container bottom.

12. An assembly according to claim 11 wherein said clamping means comprises a spherical half-cup and a detent formed by a stamping on said rear part of said spring element means.

13. A clamping and ejecting assembly for a support structure adapted to receive an apparatus, such as an autoradio or the like having complimentary clamping means thereon, said assembly comprising:
   support means including a container for receiving and supporting an apparatus having complimentary clamping means thereon;
   spring element means mounted to said support means and reciprocally movable with respect to said support means between a first retracted position and a second extracted position, said spring element means comprises a substantially flat element having a folding line which divides it into a rear part and a front part, said front part having a width and provided with an end portion having a reduced width;
   clamping means arranged upon and movable with said spring element means for matingly engaging said complimentary clamping means of said apparatus and maintaining said apparatus inserted in said support means with said spring element means in its first retracted position;
   holding means for selectively fixing said spring element means in its first retracted position, whereby said spring element means will clamp said apparatus in said support means while said holding means will keep said spring element means in said first retracted position; and
   wherein said container has a front part and wherein said holding means for said spring element means comprises a window provided in the front part of said container, said window having a widened upper portion through which said front portion of said spring element means can pass and a narrow lower portion that accommodates only said reduced end portion of the spring element means thereby holding said spring element means in said first retracted position.

* * * * *